(12) United States Patent
Agombar et al.

(10) Patent No.: US 7,873,804 B2
(45) Date of Patent: *Jan. 18, 2011

(54) APPARATUS FOR FACILITATING DISASTER RECOVERY

(75) Inventors: John Paul Agombar, Winchester (GB); Christopher Barry Beeken, Eastleigh (GB); Carlos Francisco Fuente, Portsmouth (GB); Stephanie Machleidt, Andover (GB); Simon Walsh, Hayling Island (GB)

(73) Assignee: International Business Machines Corporation, Armonk, NY (US)

( * ) Notice: Subject to any disclaimer, the term of this patent is extended or adjusted under 35 U.S.C. 154(b) by 427 days.

This patent is subject to a terminal disclaimer.

(21) Appl. No.: 11/840,829

(22) Filed: Aug. 17, 2007

(65) Prior Publication Data

US 2008/0065846 A1 Mar. 13, 2008

(30) Foreign Application Priority Data

Aug. 17, 2006 (GB) .................................. 0616375.2

(51) Int. Cl.
G06F 12/16 (2006.01)
G06F 1/26 (2006.01)
(52) U.S. Cl. ............... 711/162; 711/112; 711/E12.001; 713/324
(58) Field of Classification Search ................ 711/112, 711/162; 713/320, 324
See application file for complete search history.

(56) References Cited

U.S. PATENT DOCUMENTS

| | | | |
|---|---|---|---|
| 6,052,758 A * | 4/2000 | Crockett et al. ............. 711/113 |
| 7,370,217 B2 * | 5/2008 | Weast ........................ 713/320 |
| 7,389,379 B1 * | 6/2008 | Goel et al. .................. 711/112 |
| 7,516,346 B2 * | 4/2009 | Pinheiro et al. ............. 713/324 |
| 7,529,950 B2 * | 5/2009 | Deguchi et al. ............. 713/300 |
| 7,543,108 B2 * | 6/2009 | Kakihara et al. ............ 711/112 |
| 2002/0144057 A1 * | 10/2002 | Li et al. ..................... 711/112 |
| 2003/0196053 A1 * | 10/2003 | Tabuchi et al. .............. 711/162 |
| 2004/0236908 A1 * | 11/2004 | Suzuki et al. ............... 711/114 |
| 2004/0250032 A1 * | 12/2004 | Ji et al. ...................... 711/162 |
| 2005/0188169 A1 * | 8/2005 | Fujibayashi ................. 711/170 |
| 2007/0180211 A1 * | 8/2007 | Takaoka et al. ............. 711/170 |
| 2007/0220198 A1 * | 9/2007 | Kassai ....................... 711/112 |
| 2007/0250679 A1 * | 10/2007 | Umemura et al. ........... 711/170 |
| 2007/0260815 A1 * | 11/2007 | Guha et al. ................. 711/114 |
| 2008/0065847 A1 * | 3/2008 | Agombar et al. ............ 711/162 |

FOREIGN PATENT DOCUMENTS

CN 1178947 A 4/1998

* cited by examiner

*Primary Examiner*—Shane M Thomas
(74) *Attorney, Agent, or Firm*—Kunzler Needham Massey & Thorpe (57) ABSTRACT

An apparatus, method, and computer program for facilitating disaster recovery of a first computer system, wherein first data residing on a first storage device associated with the first computer system is recoverable from second data residing on a second storage device associated with a second computer system and wherein the second storage device is operable to have an associated state of powered up or powered down. A receiver receives an update operation for updating the second storage device. A processor updates a non-volatile storage means with the update operation, prior to update of the second storage device, wherein the non-volatile storage means is associated with the second computer system.

15 Claims, 9 Drawing Sheets

Rule 1

For a secondary storage device:
If another secondary storage device is online
    then
        invoke second write processor to update the another secondary storage device;
        update log;
        determine when the secondary storage device can be brought online;
        invoke controller to bring the secondary storage device online;
        invoke second write processor to update the secondary storage device;
        update log
    else
        transmit an alert to administrator_1

APPARATUS FOR FACILITATING DISASTER RECOVERY

CROSS-REFERENCES TO RELATED APPLICATIONS

This application claims priority to the Great Britain patent application no. GB0616375.2 entitled "AN APPARATUS FOR FACILITATING DISASTER RECOVERY" and filed on Aug. 17, 2006 for John Paul Agombar et al., which is incorporated herein by reference.

This application is related to U.S. patent application Ser. No. 11/840,833 filed on Aug. 17, 2007, titled AN APPARATUS FOR FACILITATING DISASTER RECOVERY for John Paul Agombar, et al., IBM Docket Number GB920060055US2, which is herein incorporated by reference.

BACKGROUND OF THE INVENTION

1. Field of the Invention

The present invention relates to an apparatus for facilitating disaster recovery.

2. Description of the Related Art

A disaster (e.g. a computer virus; a terrorist attack on a building; a natural disaster such as an earthquake etc.) can pose serious risks to business operations. For example, data loss; financial losses (e.g. loss of revenue); long term losses (e.g. loss of market share); recovery costs (e.g. cost of replacing infrastructure, computer hardware/software etc.) etc.

Figure 1:
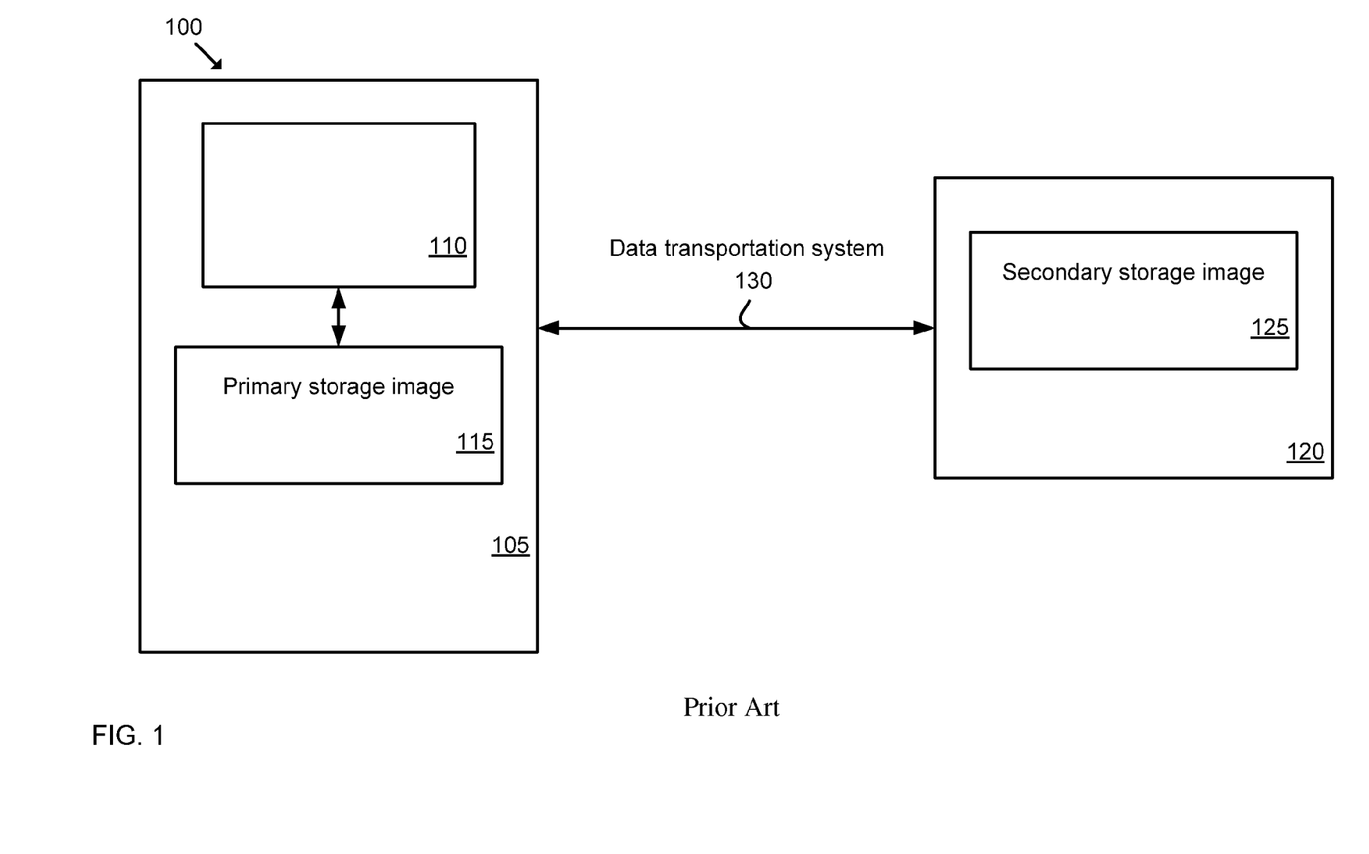
FIG. 1 is a block diagram of a prior art disaster recovery system.

Thus, many businesses today have disaster recovery (DR) systems that can be put in place in the event of a disaster. An example of a prior art DR system 100 is shown in FIG. 1, wherein a primary site 105 (e.g. a factory, a bank etc.) comprises a computer system 110 operable to manipulate data e.g. typically by performing write operations. However, it should be understood that any number of other operations can be performed e.g. software update etc. It should also be understood that typically, read operations are not subject to DR.

The data represents a primary storage image 115 stored on one or more primary storage devices e.g. shared storage arrays; tape libraries; disk storage etc. at the primary site 105. In response to the write operation, the primary storage device is updated by issuing the write operation to the primary storage device.

The DR system also comprises a secondary storage image 125 located at a secondary site 120. Preferably, the secondary site 120 is located remotely from the primary site 105 such that in the event of a disaster (e.g. an earthquake), the secondary site 120 is not affected.

The secondary storage image 125 is a replica of the primary storage image 115 and is stored on one or more secondary storage devices e.g. shared storage arrays; tape libraries; disk storage and the like at the secondary site 120. It should be understood that the secondary storage image need not be an exact replica of the primary storage image. For example, the secondary storage image can comprise a subset of the primary storage image (e.g. wherein the subset comprises the most important data of the primary storage image). The one or more secondary storage devices correspond to the one or more primary storage devices. It should be understood that a direct correspondence need not occur. It should be understood that the one or more secondary storage devices are always online.

In response to a write operation against the primary storage image 115, the primary storage image 115 is updated. Furthermore, the write operation is transmitted over a data transportation system 130 (e.g. Ethernet; fibre channel etc.) to the secondary storage image 125.

Preferably, an acknowledgement indicating receipt of the write operation is transmitted to the computer system 110. In response to receipt of the acknowledgement, a user at the computer system 110 can perform further operations against the primary storage image 115. In response to receipt of the write operation, the secondary storage image 125 is also updated by issuing the write operation to a secondary storage device.

In the event of a disaster, it is ensured that a last completed write operation has been executed against the secondary storage image 125 (i.e. wherein the write operation is the last complete write operation before the disaster occurred). The secondary storage image 125 is then used for DR purposes (e.g. data associated with the secondary storage image 125 is read; data associated with the secondary storage image 125 is used to recover some/all of the primary storage image 115 etc.).

Costs associated with maintaining a DR system can be very high. For example, there are financial and environmental costs associated with supplying energy to the secondary site 120 for powering the secondary site 120, powering and cooling the secondary storage devices etc. In another example, financial costs are associated with housing the secondary site 120. In yet another example, financial costs are associated with housing the secondary storage devices i.e. as cooling equipment for the secondary storage devices can require space, the secondary storage devices cannot be densely housed.

As a DR system may be used rarely, if at all, a business can find these costs disproportionate. Furthermore, if secondary storage devices at the secondary site 120 are low performance storage devices, a write operation executed against the secondary storage image 125 can take time to complete. This is due to the low performance of the secondary storage devices.

There is a need to provide a DR system which is cost effective, efficient and highly available.

SUMMARY OF THE INVENTION

From the foregoing discussion, there is a need for an apparatus, method, and computer program that facilitates disaster recovery. Beneficially, such an apparatus and method would update non-volatile storage with an update operation.

The present invention has been developed in response to the present state of the art, and in particular, in response to the problems and needs in the art that have not yet been fully solved by currently available disaster recovery methods. Accordingly, the present invention has been developed to provide an apparatus, method, and computer program for facilitating disaster recovery that overcome many or all of the above-discussed shortcomings in the art.

According to a first aspect the present invention provides an apparatus for facilitating disaster recovery of a first computer system, wherein first data residing on a first storage device associated with the first computer system is recoverable from second data residing on a second storage device associated with a second computer system and wherein the second storage device is operable to have an associated state of powered up or powered down. A receiver receives an update operation for updating the second storage device. A processor updates a non-volatile storage means with the update operation, prior to update of the second storage device, wherein the non-volatile storage means is associated with the second computer system. It should be understood that the update operation can comprise a write operation.

According to a second aspect the present invention provides a method for facilitating disaster recovery of a first computer system, wherein first data residing on a first storage device associated with the first computer system is recoverable from second data residing on a second storage device associated with a second computer system and wherein the second storage device is operable to have an associated state of powered up or powered down. The method comprises the steps of a receiver receiving an update operation for updating the second storage device; and a processor updating a non-volatile storage means with the update operation, prior to update of the second storage device, wherein the non-volatile storage means is associated with the second computer system.

According to a third aspect the present invention provides a computer program comprising program code means adapted to perform all the steps of the method described above when said program is run on a computer.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 2:
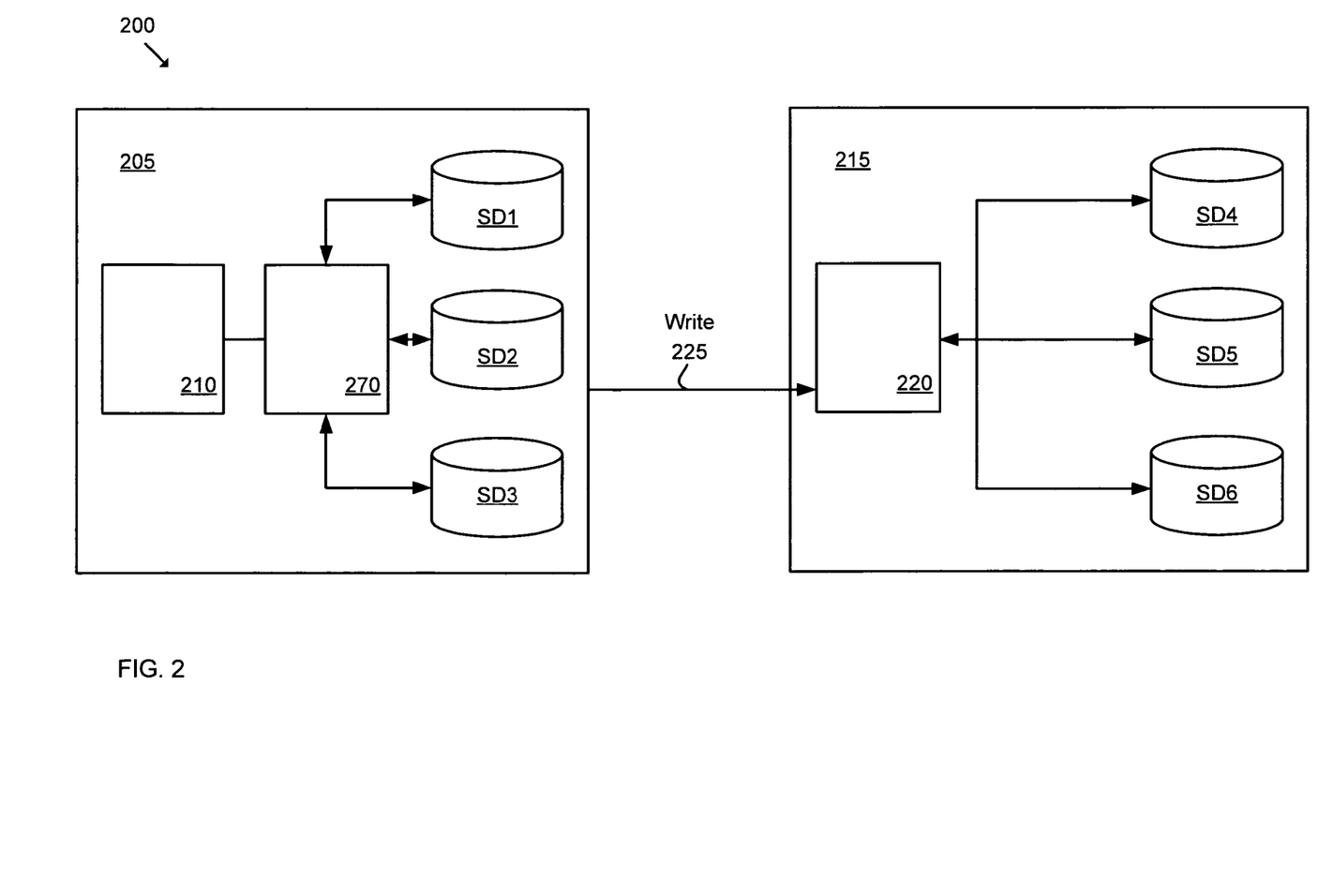
FIG. 2 is a block diagram of a disaster recovery system according to the preferred embodiment.

A preferred embodiment will now be described with reference to FIGS. 2-5E. An example of a DR system 200 is shown in FIG. 2, wherein a primary site 205 (e.g. a factory, a bank etc.) comprises a computer system 210 operable to manipulate data e.g. typically by performing write operations. A write operation is handled by a primary Storage Controller (SC) 270 associated with a storage area network (SAN).

A SAN is a network whose primary purpose is the transfer of data between computer systems and storage elements. In a SAN, storage devices are centralized and interconnected. A SAN is a high-speed network that allows the establishment of direct communications between storage devices and host computers within the distance supported by the communication infrastructure. A SAN can be shared between servers or dedicated to one server. It can be local or geographically distributed.

SANs enable storage to be externalized from the servers and centralized elsewhere. This allows data to be shared among multiple servers. Data sharing enables access of common data for processing by multiple computer platforms or servers.

The host server infrastructure of a SAN can include a mixture of server platforms. The storage infrastructure includes storage devices which are attached directly to the SAN network. SANs can interconnect storage interfaces together into many network configurations.

The data manipulated at the computer system 210 represents a primary storage image stored on a plurality of physical primary storage devices (Storage Device 1 SD1, Storage Device 2 SD2 and Storage Device 3 SD3) at the primary site 205. The plurality of primary storage devices can be shared storage arrays; tape libraries; disk storage etc. In response to the write operation, a primary storage device is updated by the primary SC 270 by issuing the write operation to the primary storage device.

It should be understood that the primary site 205 may also comprise a directory accessible by the primary SC 270. Preferably, the primary SC 270 writes data to the directory wherein the data comprises data associated with the write operation (e.g. "write operation issued" or "write operation not issued").

The DR system 200 also comprises a data transport system 225 (e.g. Ethernet, fibre channel etc.) for transmitting the write operation from the primary SC 270 to a DR apparatus 220 at the secondary site 215. Preferably, the secondary site 215 is located remotely from the primary site 205. The secondary site 215 is a replica of the primary site 205. It should be understood that the secondary site need not be an exact replica of the primary site.

Figure 3:
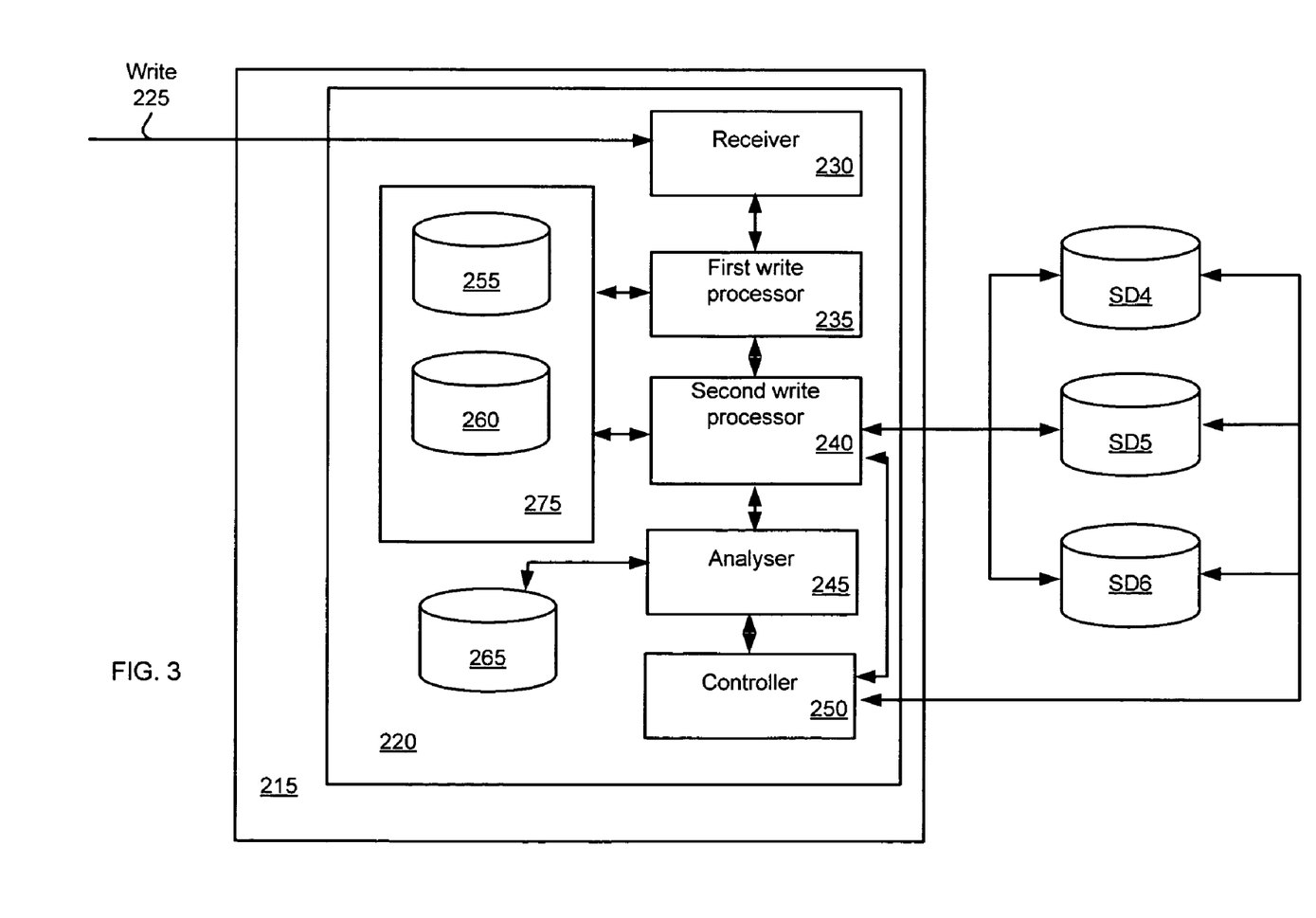
FIG. 3 is a block diagram of a disaster recovery apparatus according to the preferred embodiment.

The DR apparatus 220 represents a stack of components wherein data flows through the stack. As shown in FIG. 3, the DR apparatus 220 comprises a receiver 230 and a first write processor 235 operable to communicate with each other.

The DR apparatus 220 also comprises a second write processor 240 operable to communicate with the first write processor 235; an analyzer 245 and a controller 250. The second write processor 240 is also operable to communicate with a plurality of physical secondary storage devices (Storage Device 4 SD4, Storage Device 5 SD5 and Storage Device 6 SD6). For example, the second write processor 240 receives execution data from the plurality of secondary storage devices (i.e. wherein the execution data indicates whether a secondary storage device is online or offline). It should be understood that although two write processors have been shown, any number of write processors can be implemented.

The analyzer 245 is operable to communicate with the second write processor 240 and the controller 250. The controller 250 is operable to communicate with the plurality of secondary storage devices.

The DR apparatus 220 also comprises an area of non-volatile memory 255 and a log 260, together termed herein as "a high performance cache" (HPC) 275. The HPC 275 is accessible by the first write processor 235 and the second write processor 240.

Preferably, the non-volatile memory 255 has an associated high performance. Preferably, the non-volatile memory 255 can cache data associated with the primary storage image (i.e. data residing across all three primary storage devices). Alternatively, a plurality of non-volatile memories 255 is provided. Preferably, the non-volatile memory 255 is always available. It should be understood that the non-volatile memory 255 can reside on any number of computer systems (e.g. in a remote computer system, within a SC etc.). It should be understood that although the non-volatile memory 255 and the log 260 are depicted as two separate storage means, the non-volatile memory 255 and the log 260 can reside on any number of storage means.

The DR apparatus 220 also comprises a rule base 265 for storing a rule, wherein the rule base 265 is accessible by the analyzer 245. A secondary storage image which is a replica of the primary storage image is stored on the plurality of physical secondary storage devices (Storage Device 4 SD4, Storage Device 5 SD5 and Storage Device 6 SD6). The plurality of secondary storage devices can be shared storage arrays; tape libraries; disk storage; etc. It should be understood that the secondary storage image need not be an exact replica of the primary storage image.

The secondary storage devices correspond to the plurality of primary storage devices (Storage Device 1 SD1, Storage Device 2 SD2 and Storage Device 3 SD3 respectively). It should be understood that a direct correspondence need not occur. For example, in a virtualization environment, a logical view of storage is separated from its physical implementation. This enables physical changes to be made without changing the logical view. Thus, for example, by using a virtualization function associated with a secondary SC at the secondary site 215, the secondary storage image can be stored across varying and multiple secondary storage devices. A user at the primary site 205 is not aware of the configuration of the physical secondary storage devices. It should be understood that virtualization can be provided for at least one of the primary site 205 and the secondary site 215. Alternatively, as described in the examples herein, virtualization need not be provided.

According to a preferred embodiment, it should be understood that the plurality of secondary storage devices need not always be online—as will be described in more detail herein.

A process according to the preferred embodiment will now be described with reference to FIGS. 2-5E. In a first example, the primary SC 270 maps SD1 to SD4. With reference to FIG. 5A, in the first example, a user uses the computer system 210 at the primary site 205 to perform step 500 a write operation against the primary storage image, in a first example, against a subset of the primary storage image residing on SD1.

The write operation is represented as a primary data block. The primary data block comprises data content and location information associated with a location of the primary storage device (i.e. SD1) on which the subset of the primary storage image is stored.

In response to the write operation, SD1 is updated step 505 by the primary SC 270 by issuing the write operation to SD1. The primary SC 270 updates the directory with data associated with the primary data block and status data associated with status of the primary data block (i.e. write operation issued). The primary SC 270 transmits step 510 the write operation over the data transport system 225 to the DR apparatus 220 where it is received step 515 by the receiver 230.

Mapping data associated with the secondary storage device (e.g. an identifier of the secondary storage device, namely, "SD4") mapped to the primary storage device is also transmitted by the primary SC 270 to the receiver 230.

The receiver 230 can transmit an acknowledgement to the computer system 210 at the primary site 205 in response to receipt of the write operation. Thus, the user, in response to receipt of the acknowledgement, can perform further write operations.

In response to receipt of the write operation, the first write processor 235 uses the mapping data to query the second write processor 240 in order to determine step 520 whether the mapped secondary storage device (i.e. SD4) is online. The second write processor 240 uses the mapping data and execution data to determine whether the mapped secondary storage device is online.

If SD4 is online, the first write processor 235 passes the write operation and mapping data to the second write processor 240. Alternatively, before passing the write operation and mapping data to the second write processor 240, the first write processor 235 updates the non-volatile memory 255 by issuing the write operation to the non-volatile memory 255.

Figure 5A:
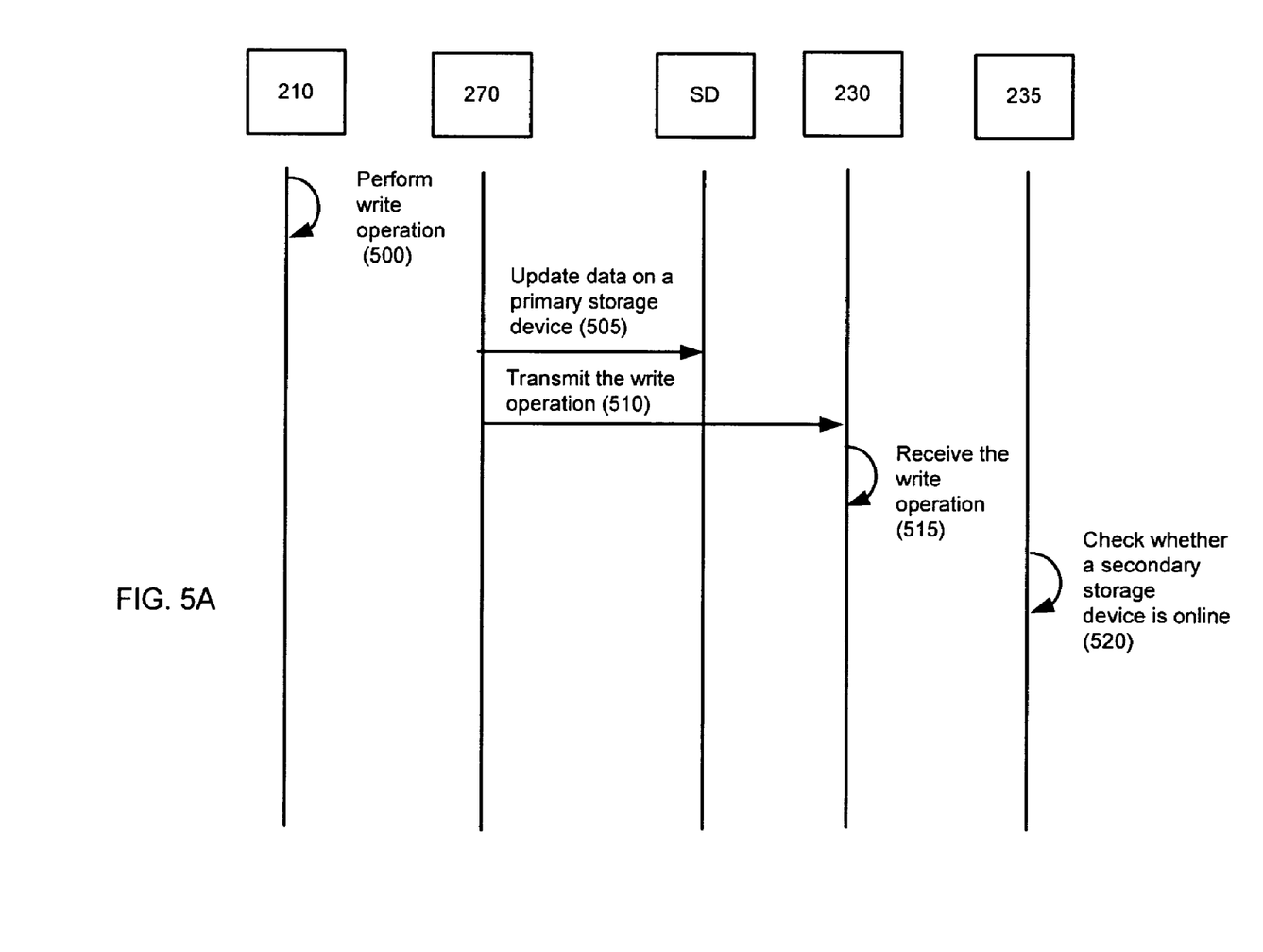
FIG. 5A is a flow chart showing the operational steps involved in a first process according to the preferred embodiment.
Figure 5B:
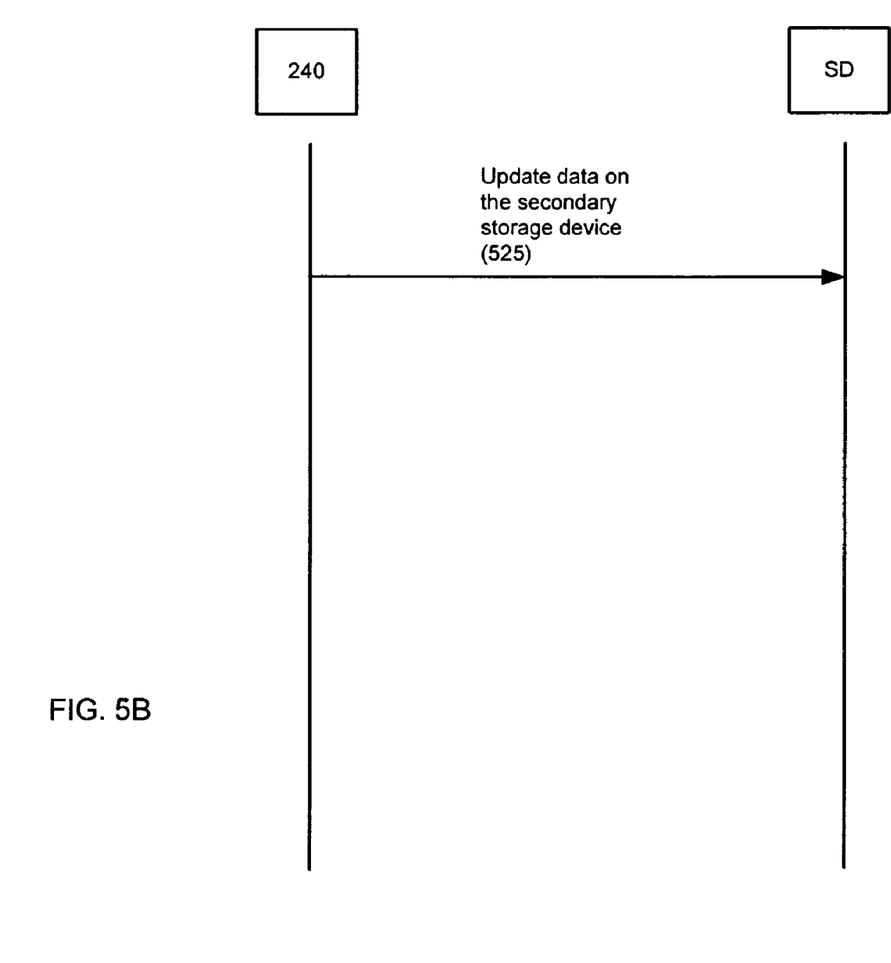
FIG. 5B is a flow chart showing the operational steps involved in a second process according to the preferred embodiment.

With reference to FIG. 5B, the second write processor 240 updates step 525 SD4 by issuing the write operation to SD4. The second write processor 240 updates the log 260 with data associated with the write operation (i.e. write operation issued).

Data associated with the update of SD4 is passed to the receiver 230. The receiver 230 can transmit an acknowledgement to the computer system 210 at the primary site 205 in response to update of a secondary storage device. The subset of the secondary storage image held on SD4 (as well as, for example, subsets of the secondary storage image held on at least one of SD5 and SD6) can now be used for DR purposes.

For example, the subset can be at least one of: read for DR purposes; written to one or more primary storage devices if the one or more primary storage devices are available after the disaster occurred; written to one or more storage devices at a third site; used to create a temporary primary site—in this case, the non-volatile memory 255 is brought offline and each secondary storage device is brought online permanently. Preferably, the temporary primary site is converted back to a secondary site, once a new primary site is created.

Once a secondary storage device has been updated, existing power down mechanisms can power down the secondary storage device (and any remaining online secondary storage devices). Advantageously, power consumption is saved. In the event of a disaster, the secondary storage devices can be powered up.

If a disaster occurs at the primary site 205, the second write processor 240 checks the log 260 in order to determine status data associated with a last write operation. A last operation can comprise the last write operation received at the DR apparatus 220 prior to the disaster occurring. Alternatively, a last operation can comprise the last write operation acknowledged by the DR apparatus 220 prior to the disaster occurring. Specifically, the second write processor 240 checks the log 260 in order to determine whether the last write operation was updated at a secondary storage device.

If the second write processor 240 determines that a last write operation has been updated against SD4, the updated data residing in SD4 (as well as, for example, data residing on at least one of SD5 and SD6) can be used for DR purposes. If the second write processor 240 determines that a last write operation has not been updated against SD4, in one example, the second write processor 240 updates SD4 by issuing the write operation to SD4. Thus, the updated data residing in SD4 (as well as, for example, data residing on at least one of SD5 and SD6) can be used for DR purposes.

Alternatively, in another example, the second write processor 240 does not update the secondary storage device. Rather, the data residing in the non-volatile memory 255 itself can be used for DR purposes.

Figure 5C:
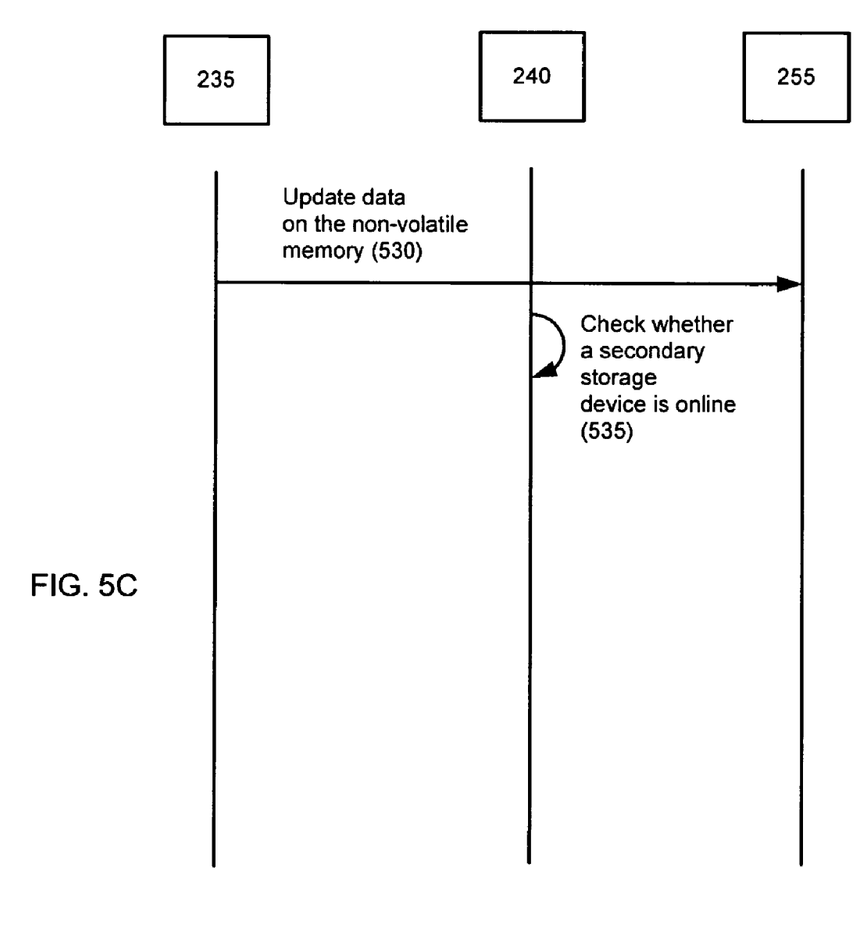
FIG. 5C is a flow chart showing the operational steps involved in a third process according to the preferred embodiment.

If in response to step 520, the first write processor 235 determines that SD4 is offline, with reference to FIG. 5C, the first write processor 235 updates step 530 the non-volatile memory 255 by issuing the write operation to the non-volatile memory 255. The first write processor 235 updates the log 260 with data associated with the write operation (i.e. write operation issued).

Data associated with update of the non-volatile memory 255 is passed to the receiver 230. The receiver 230 can transmit an acknowledgement to the computer system 210 at the primary site 205 in response to update of the non-volatile memory 255. The first write processor 235 passes mapping data to the second write processor 240.

Preferably, in response to the update of the non-volatile memory 255, the second write processor 240 uses the mapping data and execution data to determine step 535 whether the mapped secondary storage device (i.e. SD4) is online e.g. SD4 may have been brought online after step 520 was executed. If SD4 is online, the first write processor 235 passes the write operation to the second write processor 240 and step 525 in FIG. 5B is executed as described above.

Figure 5D:
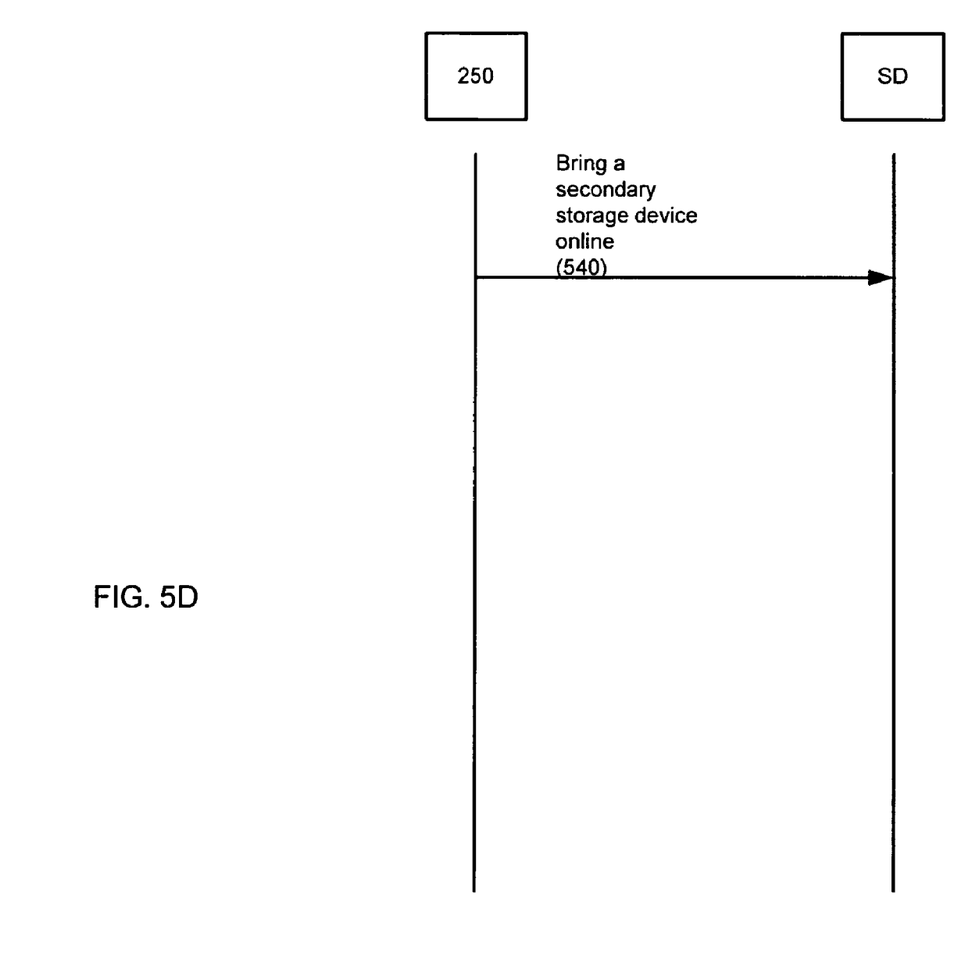
FIG. 5D is a flow chart showing the operational steps involved in a fourth process according to the preferred embodiment.

If SD4 is offline, with reference to FIG. 5D, the second write processor 240 is operable to invoke the controller 250. The controller 250 is operable to bring step 540 SD4 online. In response to SD4 being brought online, the first write processor 235 passes the write operation to the second write processor 240 and step 525 in FIG. 5B is executed as described above. In a second example, the primary SC 270 maps SD1 to SD4.

With reference to FIG. 5A, steps 500 to 520 are executed as described above. In the second example, the first write processor 235 determines step 520 that SD4 is offline.

Figure 5E:
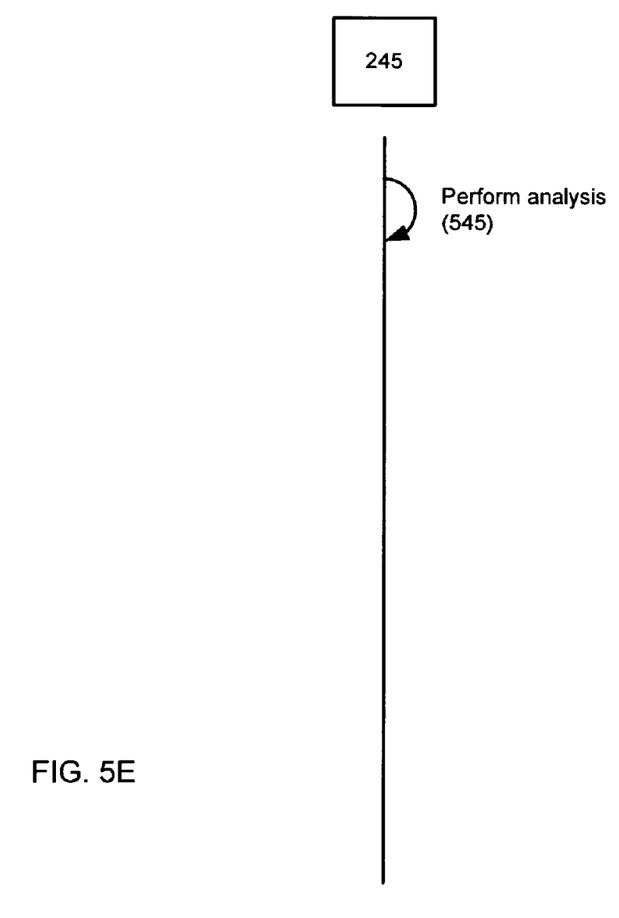
FIG. 5E is a flow chart showing the operational steps involved in a fifth process according to the preferred embodiment.

With reference to FIG. 5E, in the second example, in response to a determination that SD4 is offline, the analyzer 245 performs step 545 analysis. The analyzer accesses a threshold configurable by an administrator, a system etc. The threshold is associated with power consumption and has a value of 20 W (Watts). It should be understood that threshold can be associated with any number of other parameters e.g. a size of data already residing on a secondary storage device; a rate of increase of a size of data already residing on a secondary storage device etc.

The analyzer 245 also communicates with the second write processor 240 to obtain execution data associated with the remaining secondary storage devices (i.e. SD5 and SD6). In the second example, SD5 is offline and SD6 is online.

The analyzer 245 also determines a power consumption value (e.g. wherein the power consumption value is supplied by existing DR mechanisms) associated with each secondary storage device when online. In the second example, each secondary storage device has an associated power consumption value of 20 W (Watts) when online.

The analyzer 245 also determines a current power consumption value associated with the mapped secondary storage device (i.e. SD4) and the remaining online secondary storage device (i.e. SD6). In the second example, SD4 has an associated power consumption value of 0 W (as SD4 is offline) and SD6 has an associated power consumption value of 20 W (as SD6 is online).

The analyzer 245 analyses the power consumption value associated with an online secondary storage device and the current power consumption values associated with SD4 and SD6 in order to determine whether bringing SD4 online will exceed the power consumption threshold. If the analyzer 245 determines that bringing SD4 online will not exceed the power consumption threshold, preferably, the analyzer 245 invokes the controller 250 which is operable to bring step 540 SD4 online.

In response to SD4 being brought online, the first write processor 235 passes the write operation and mapping data to the second write processor 240. The second write processor 240 updates step 525 SD4 by issuing the write operation to SD4. The second write processor 240 updates the log 260 with data associated with the write operation (i.e. write operation issued).

It should be understood that once the mapped secondary storage device has been updated, it (e.g. SD4) (and any remaining online secondary storage devices (e.g. SD6)) can be powered down, advantageously, saving power. The updated data residing in SD4 (as well as, for example, data residing on at least one of SD5 and SD6) can be used for DR purposes.

However, in the second example, the analyzer 245 determines that bringing SD4 online would result in a further current power consumption value of 40 W (Watts) in total (i.e. as SD4 would have an associated power consumption value of 20 W (Watts) when online and SD6 has a current power consumption value of 20 W). Thus, the analyzer 245 determines that the further current power consumption value of 40 W would exceed the power consumption threshold of 30 W.

Figure 4:
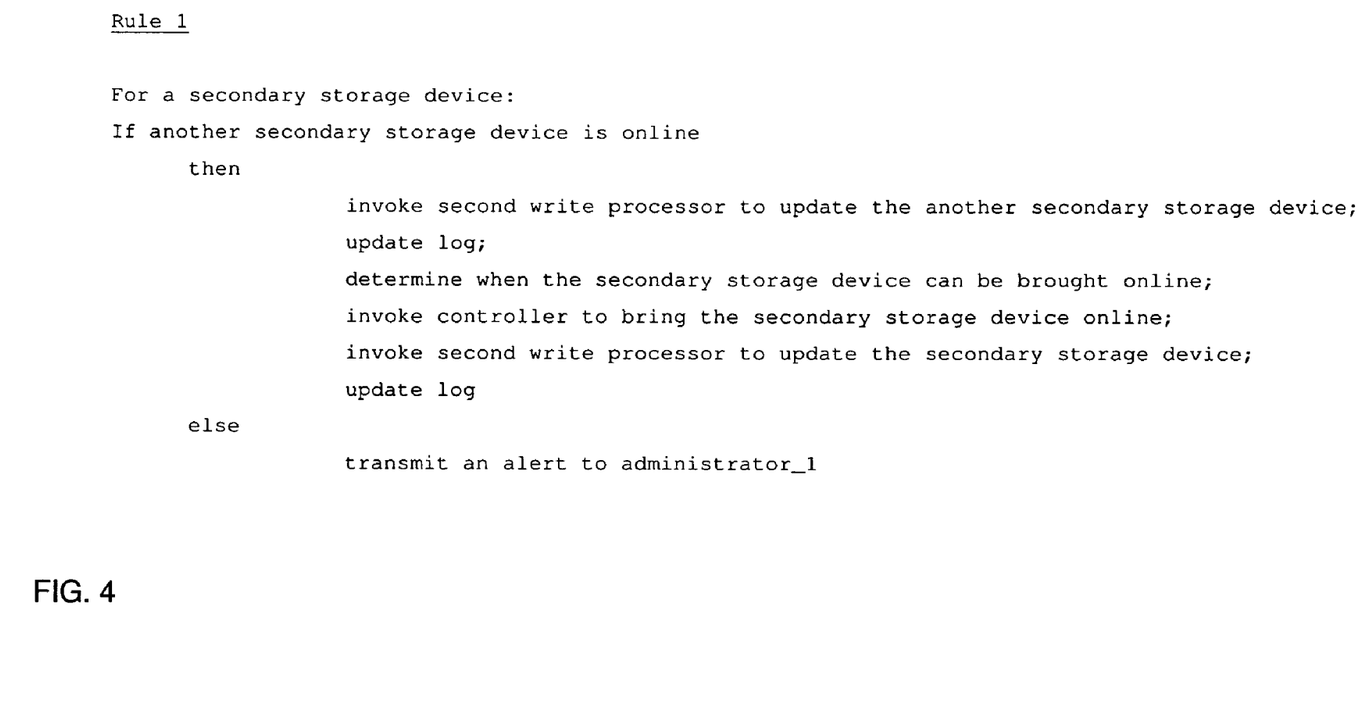
FIG. 4 is a representation of a rule associated with powering up a secondary storage device according to the preferred embodiment.

In the second example, in response to determining that bringing SD4 online will exceed the power consumption threshold, the analyzer 245 performs step 545 further analysis and accesses one or more pre-configurable rules stored in a rule base 265 e.g. Rule 1 shown in FIG. 4. It should be understood that the rule depicted is for exemplary purposes only.

According to Rule 1, the analyzer 245 communicates with the second write processor 240 to obtain execution data and determines that a remaining secondary storage device is online (i.e. SD6). In response to SD6 being online, the second write processor 240 updates SD6 (according to a first "invoke" sub-rule) by issuing the write operation to SD6. The second write processor 240 updates the log 260 with data associated with the write operation (i.e. write operation issued) (according to a first "update" sub-rule).

A representation of the log is shown below:

Log:

Write operation issued against SD6

The analyzer 245 monitors data in order to determine (according to a "determine" sub-rule) when the secondary storage device can be brought online. In one example, the analyzer 245 receives first data from administrator_1, that is, an explicit command to bring SD4 online. In another example the analyzer 245 receives second data from administrator_1, that is, a re-configured threshold (e.g. the threshold having a value of 80 W (Watts)) such that that by bringing SD4 online, the power consumption threshold is not exceeded.

In response to determining that the secondary storage device can be brought online, the analyzer 245 is operable to invoke the controller 250 (according to a second "invoke" sub-rule). The controller 250 is operable to bring step 540 SD4 online. In response to SD4 being brought online, the first write processor 235 passes the write operation and mapping data to the second write processor 240.

The second write processor 240 updates step 525 (according to a third "invoke" sub-rule) SD4 by issuing the write operation to SD4. The second write processor 240 updates the log 260 with data associated with the write operation (i.e.

write operation issued) (according to a second "update" sub-rule). A representation of the log is shown below:

Log:
Write operation issued against SD6
Write operation issued against SD4

Once the mapped secondary storage device has been updated, it (e.g. SD4) (and any remaining online secondary storage devices (e.g. SD6)) can be powered down, advantageously, saving power. The updated data residing in SD4 (as well as, for example, data residing on at least one of SD5 and SD6) can be used for DR purposes.

If the analyzer 245 determines that another secondary storage device is not online, this means that all secondary storage devices are offline and bringing one secondary storage device online would exceed the power consumption threshold. This is not desirable for a DR system wherein secondary storage devices need to be made available to be usable for DR purposes.

Thus, preferably the analyzer 245 transmits an alert to an administrator (i.e. administrator_1) (according to a "transmit" sub-rule). Preferably, in response to receipt of the alert, administrator_1 re-configures the power consumption threshold such that by bringing one or more secondary storage device online, the power consumption threshold is not exceeded.

In the first and second examples, a secondary storage device is updated in response to update of the non-volatile memory 255. That is, if a secondary storage device is online, the secondary storage device is updated by issuing the write operation to the secondary storage device. If a secondary storage device is not online, the secondary storage device is brought online and updated or another secondary storage device that is already online is updated.

Alternatively, update of a secondary storage device can occur in response to a further event (i.e. an event in addition to update of the non-volatile memory 255). For example, a further event comprises the non-volatile memory 255 being full. In another example, a further event comprises a time value e.g. a time value associated with increased or decreased activity at the primary site (e.g. 18:00 daily). In yet another example, a further event comprises a disaster occurring.

Advantageously, the embodiment helps to reduce costs associated with maintaining a DR system. For example, as the secondary storage devices need not always be online, costs associated with powering, cooling etc. the secondary storage devices are reduced. Furthermore, as cooling requirements are decreased, the secondary storage devices can be more densely housed. Furthermore, by the provision of a high performance non-volatile memory 255, there is a decreased need to provide high performance (and therefore, expensive) secondary storage devices.

Advantageously, according to the embodiment, although secondary storage devices can be low performance storage devices, as a write operation is executed against the non-volatile memory 255 (wherein the non-volatile memory has an associated high performance), the write operation is completed quickly. Thus, an acknowledgement can be promptly transmitted back to the primary site and a user can perform further operations against the primary storage image.

Advantageously, the embodiment provides for a highly available DR system, as the non-volatile memory 255 is always available and as at least one of: the non-volatile memory 255 and the secondary storage devices is updated so as to be usable for DR purposes. Advantageously, the embodiment provides for a DR system which is cost effective, efficient and highly available.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative embodiment, the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

What is claimed is:

1. An apparatus for facilitating disaster recovery of a first computer system, wherein first data residing on a first storage device associated with the first computer system is recoverable from second data residing on a second storage device associated with a second computer system and wherein the second storage device is operable to have an associated state of powered up or powered down, the apparatus comprising:
   a receiver receiving an update operation for updating the second storage device with the first data;
   a first processor determining if the second storage device is offline by querying a second processor with an identifier for the second storage device from the first data, the second processor in communication with the second storage device;
   when the first processor determines from the second processor that the second storage device is online:
      the second processor updates the second storage device with the first data;
      the receiver transmits an acknowledgement of the update operation;
   when the first processor determines from the second processor that the second storage device is offline:
      the first processor writes the first data to a third storage device;
      the receiver transmits the acknowledgement of the update operation;
      the first processor passes the identifier to the second processor;
      the second processor determines if the second storage device is offline using the identifier;
      the second processor brings the second storage device online if the second storage device is offline;
      the first processor passes the update operation to the second processor in response to the second storage device being brought online; and
      the second processor updates the second storage device with the first data.

2. An apparatus as claimed in claim 1, wherein the second computer system is remote from the first computer system.

3. An apparatus as claimed in claim 1, wherein the second processor is operable to access state data associated with the second storage device.

4. An apparatus as claimed in claim 3, wherein the second processor uses the state data to determine whether the second storage device is powered up or powered down.

5. An apparatus as claimed in claim 1, wherein the second processor access a rule base comprising a rule associated with bringing online the second storage device.

6. A computer readable storage medium comprising a computer readable program stored on a tangible storage device for facilitating disaster recovery of a first computer system, wherein first data residing on a first storage device associated with the first computer system is recoverable from second data residing on a second storage device associated with a second computer system and wherein the second storage device is operable to have an associated state of powered up or powered down, wherein the computer readable program when executed on a computer causes the computer to perform the steps of:
   receiving by a receiver an update operation for updating the second storage device with the first data;
   determining by a first processor if the second storage device is offline by querying a second processor with an identifier for the second storage device from the first data, the second processor in communication with the second storage device;
   when the first processor determines from the second processor that the second storage device is online:
      updating by the second processor the second storage device with the first data;
      transmitting by the receiver an acknowledgement of the update operation;
   when the first processor determines from the second processor that the second storage device is offline:
      writing by the first processor the first data to a third storage device;
      transmitting by the receiver the acknowledgement of the update operation;
      passing by the first processor the identifier to the second processor;
      determining by the second processor if the second storage device is offline using the identifier;
      bringing by the second processor the second storage device online if the second storage device is offline;
      passing by the first processor the update operation to the second processor in response to the second storage device being brought online; and
      updating by the second processor the second storage device with the first data.

7. The computer readable storage medium as claimed in claim 6, wherein the second computer system is remote from the first computer system.

8. The computer readable storage medium as claimed in claim 6, wherein the second processor is operable to access state data associated with the second storage device.

9. The computer readable storage medium as claimed in claim 6, wherein the second processor uses the state data to determine whether the second storage device is powered up or powered down.

10. The computer readable storage medium as claimed in claim 6, wherein the second processor accesses a rule base comprising a rule associated with bringing online the second storage device.

11. A method for facilitating disaster recovery of a first computer system, wherein first data residing on a first storage device associated with the first computer system is recoverable from second data residing on a second storage device associated with a second computer system and wherein the second storage device is operable to have an associated state of powered up or powered down, the method comprising the steps of:
   receiving by a receiver an update operation for updating the second storage device with the first data;
   determining by a first processor if the second storage device is offline by querying a second processor with an identifier for the second storage device from the first data, the second processor in communication with the second storage device;
   when the first processor determines from the second processor that the second storage device is online:
      updating by the second processor the second storage device with the first data;
      transmitting by the receiver an acknowledgement of the update operation;
   when the first processor determines from the second processor that the second storage device is offline:
      writing by the first processor the first data to a third storage device;

transmitting by the receiver the acknowledgement of the update operation;
passing be the first processor the identifier to the second processor;
determining by the second processor if the second storage device is offline using the identifier;
bringing by the second processor the second storage device online if the second storage device is offline;
passing by the first processor the update operation to the second processor in response to the second storage device being brought online; and
updating by the second processor the second storage device with the first data.

12. The method as claimed in claim 11, wherein the second computer system is remote from the first computer system.

13. The method as claimed in claim 11, wherein the second processor is operable to access state data associated with the second storage device.

14. The method as claimed in claim 11, wherein the second processor uses the state data to determine whether the second storage device is powered up or powered down.

15. The method as claimed in claim 11, wherein the second processor accesses a rule base comprising a rule associated with bringing online the second storage device.

* * * * *